United States Patent [19]

Fratzer et al.

[11] 4,383,974
[45] May 17, 1983

[54] CATALYTIC WASTE GAS CONVERTER FOR COMBUSTION MACHINES

[75] Inventors: Gerhard Fratzer; Bernhard Beck, both of Rheinfelden, Fed. Rep. of Germany

[73] Assignee: Degussa Aktiengesellschaft, Frankfurt am Main, Fed. Rep. of Germany

[21] Appl. No.: 391,355

[22] Filed: Jun. 23, 1982

Related U.S. Application Data

[62] Division of Ser. No. 203,673, Nov. 3, 1980.

[30] Foreign Application Priority Data

Nov. 7, 1979 [DE] Fed. Rep. of Germany ....... 2944841

[51] Int. Cl.³ .......................... B01D 53/36; F01N 3/28
[52] U.S. Cl. ..................................... 422/176; 422/179; 422/180; 422/181
[58] Field of Search ............... 422/176, 177, 179, 180, 422/181; 60/299; 252/477 R; 423/213.2, 213.5; 428/256

[56] References Cited

U.S. PATENT DOCUMENTS

| | | | |
|---|---|---|---|
| 3,166,382 | 1/1965 | Purse et al. | 422/181 |
| 3,768,981 | 10/1973 | Alliger | 422/181 |
| 3,920,404 | 11/1975 | Gandhi et al. | 422/181 |
| 3,964,875 | 6/1976 | Chang et al. | 422/176 |
| 3,989,471 | 11/1976 | Nowak | 422/179 |
| 4,078,898 | 3/1978 | Fedor et al. | 422/181 |
| 4,149,862 | 4/1979 | Sewell | 422/181 |
| 4,208,374 | 6/1980 | Foster | 422/179 |
| 4,220,625 | 9/1980 | Toh et al. | 422/180 |
| 4,271,044 | 6/1981 | Fratzer et al. | 252/477 R |

*Primary Examiner*—Bradley Garris
*Attorney, Agent, or Firm*—Cushman, Darby & Cushman

[57] ABSTRACT

There is disclosed a catalytic waste gas converter for internal combustion engines of various types in which there is used as carrier for the catalyst a carrier matrix made of a steel screen arranged in a housing holder. There are employed special flow guides made of spirally wound steel matrices for the various flow through possibilities favorable to conversion of the waste gas to be purified.

11 Claims, 12 Drawing Figures

CATALYTIC WASTE GAS CONVERTER FOR COMBUSTION MACHINES

This is a division of application Ser. No. 203,673 filed Nov. 3, 1980.

BACKGROUND OF THE INVENTION

The invention is directed to a catalytic waste gas converter for internal combustion engines in which there is used as carrier for the catalyst a carrier matrix made of steel screening and which through special flow guides for the engine waste gas to be purified, the steel screen matrix exhausts flow through possibilities inherent in those matrices.

The toxic materials of waste gases especially waste gases from internal combustion motors of the steadily increasing number of motor vehicles represents a considerable danger to the health of men, animals and plants. They are limited in several countries by the legal regulation to maximum concentrations of toxic material. Among the solutions proposed for these air pollution problems and already practiced methods, the catalytic waste gas purification process has acquired the greatest importance. Greatest demands have been placed on the catalysts required therefore in regard to behavior on heating, effectiveness, lasting activity and mechanical stability. For example, when employed in motor vehicles, they must be effective even at the lowest possible temperatures and guarantee a high percentage reaction of the toxic materials to be removed (especially hydrocarbons, carbon monoxide and nitric oxide as well as aldehydes, alcohols and carbon black) to form the non-toxic oxidation and reduction products carbon dioxide, steam and nitrogen for a long time at all temperatures and space velocities which are used. Because of the severe mechanical requirements during the operation, they must possess a sufficient mechanical stability and are permitted not be be lost even with long overheating, as can occur in a given case through being acted on by unburned fuel, for example, in ignition loss in one or more cylinders. Thus, they must satisfy a number of conditions which are difficult to fulfill simultaneously or run contrary to one another.

Previously, besides poured bed catalysts, i.e., or extrudates of catalyst carriers or interspersant or mixed catalysts there were used above all, monolithic catalyst carriers. They consist of an inert, low surface area ceramic skeleton of, e.g. cordierite, mullite or α-aluminum oxide as structural reinforcer to which there is applied a thin, usually high surface area layer of a heat resistance, usually oxidic carrier material such as aluminum oxide of the so-called gamma series, which latter in turn carries the true catalytically active components. These can consist of noble metals, noble metal compounds or non-noble metal compounds. Of the group of noble metals, there are employed for example platinum, palladium, rhodium, ruthenium, iridium, gold and silver.

As non-noble metal compounds there are employed, e.g. the oxides of copper, chromium, manganese, iron, cobalt, nickel and their combinations as e.g. copper chromite. Further variants are formed by combining noble metals or their compounds with non-noble metals or their compounds or non-noble metals or their compounds with noble metals or their compounds. In many cases there are added to the active components small amounts of other elements, for example, from the group of alkaline earth metals such as magnesium, calcium, strontium or barium, from the group of rare earths, as e.g. samarium, lanthanum, cerium or from the fourth group of the periodic system, as, e.g. titanium, zirconium or tin, as so-called promoters for improving specific properties of the system.

As a considerable disadvantage of the catalyst having ceramic structural reinforcers, especially the monolithic honeycomb catalysts of cordierite, mullite or α-aluminum oxide, there has proven their poor heat conductivity and their sensitivity to mechanical influences and thermal overheating. Thus the vibrations occurring during traveling through the intermittent impulse of the waste gas columns, the motor vibration and the traveling motions in combination with temperature peaks act to wear down and crumble the ceramic. With thermal overheating in the spatially narrowly limited monoliths there can occur sintering, melting and fusing of the structural reinforcer in the form of monoliths or poured bodies with its coatings from which partial or complete inactivation results.

Furthermore, it has been proven that installing such ceramic honeycombs in metal housings is difficult because of the different thermal expansion of ceramic and metal and requires expensive construction precautions in order to guarantee an elastic and gas tight holding of the honeycomb with the relative motions at the continuously changing operating temperatures in the possible range between $-30°$ and $+1000°$ C.

Therefore, there has been a series of efforts to find better suited replacement materials for the catalyst built on a ceramic basis and to look for a more favorable spatial designing for these.

Thus there has already been described a carrier matrix which is prepared from an alternatively arranged corrugated and smooth high temperature resistant steel sheet which is coated with catalyst. However, in this case, there is the disadvantage that the carrier has a limited geometrical surface which limits to such an extent the supporting capability compared to catalyst carrying, high surface area, heat resistant metal oxides, such as $\gamma$-$Al_2O_3$, present in immersed dispersion that to produce a sufficiently strong coating on these oxides with the actually catalytically active components there is needed a many times repeated immersion process. Since the known carrier matrices are passed through by flow channels separated from one another, the reacting gas mixture only comes in contact with the catalyst material in the form of individual enclosed, longitudinally flowing gas columns from the walls; through this with predetermined gas flow velocity there is required a specific, frequently too large minimum length of the matrix in order to produce a satisfactory exchange of material and connected therewith a sufficient degree of conversion.

Subsequently, there occurs between the individual longitudinally running discrete reaction zones a drop in temperature for example because of local more or less different layer thicknesses and activities of the catalyst material which can only be equalized via the specific heat conductivity of the material of the channel wall.

According to German patent application P 2853547.9, and corresponding U.S. Ser. No. 102,581, filed Dec. 11, 1979, now U.S. Pat. No. 4,271,044, the problem of providing carrier matrices for catalysts having flow channels passing therethrough consisting of superimposed layers of high temperature resistant and scale resistant steel, which permits a cross current between the individual flow channels, has an enlarged geometrical surface and shows an improved supporting capability compared to catalyst carrying carrier materials present in immersing dispersions, is solved by constructing the matrix of alternating layers of smooth and corrugated screens (sieve netting) whereby the layers are coiled to a cylinder having a spiral cross section and having numerous flow channels.

In consideration of the fact that in such coils in addition to the normally longitudinally flowing channels of the motor waste gas to be purified, there also is permitted via the openings of the screens a cross current to adjacent channels (so-called cross current effect) there is a need of holding apparatuses for such matrices which permit the utilization of these inherent flow possibilities in a more favorable manner.

SUMMARY OF THE INVENTION

According to the invention there is designed a catalytic waste gas converter for internal combustion engines of various types in which there is used as carrier for the catalyst, a carrier matrix made of a steel screen (or sieve netting) arranged in a housing holder and employing special flow guides made of spirally wound steel matrices for the various flow through possibilities favorable to the conversion of the waste gase to be purified. The objects of the invention are realized for example by various types of catalytic converters shown in the drawings. In the various developments of the invention the stated individual types of fastening for the represented screen matrix having alternating smooth and corrugated screen layers which is an essential component of the converter should be interchangeable with each other.

In regard to the winding or coiling of the carrier defined in the claims the type of manufacture, selection of material, pretreatment as well as coating with catalyst carrying metal oxides and catalyst compositions, there can be used for example, those disclosed in the two German patent applications P No. 2853547.9, mentioned before and P No. 2908671.3. The entire disclosure of these two German applications is hereby incorporated by reference and relied upon.

BRIEF DESCRIPTIONS OF THE DRAWINGS

FIG. 1 is a schematic longitudinal sectional view of a converter embodying this invention in which there is an impingement of the cylindrical or tubular catalyst-carrying matrix with waste gas both on its upstream end, via the upstream openings in the gas inlet tube outside the matrix, and on the walls of the central opening extending therethrough, via the perforated section of the gas inlet tube extending into the matrix, and a flowing off or exit of the gas from both the entire outer periphery of the matrix and its downstream end.

DETAILED DESCRIPTION

Figure 1:
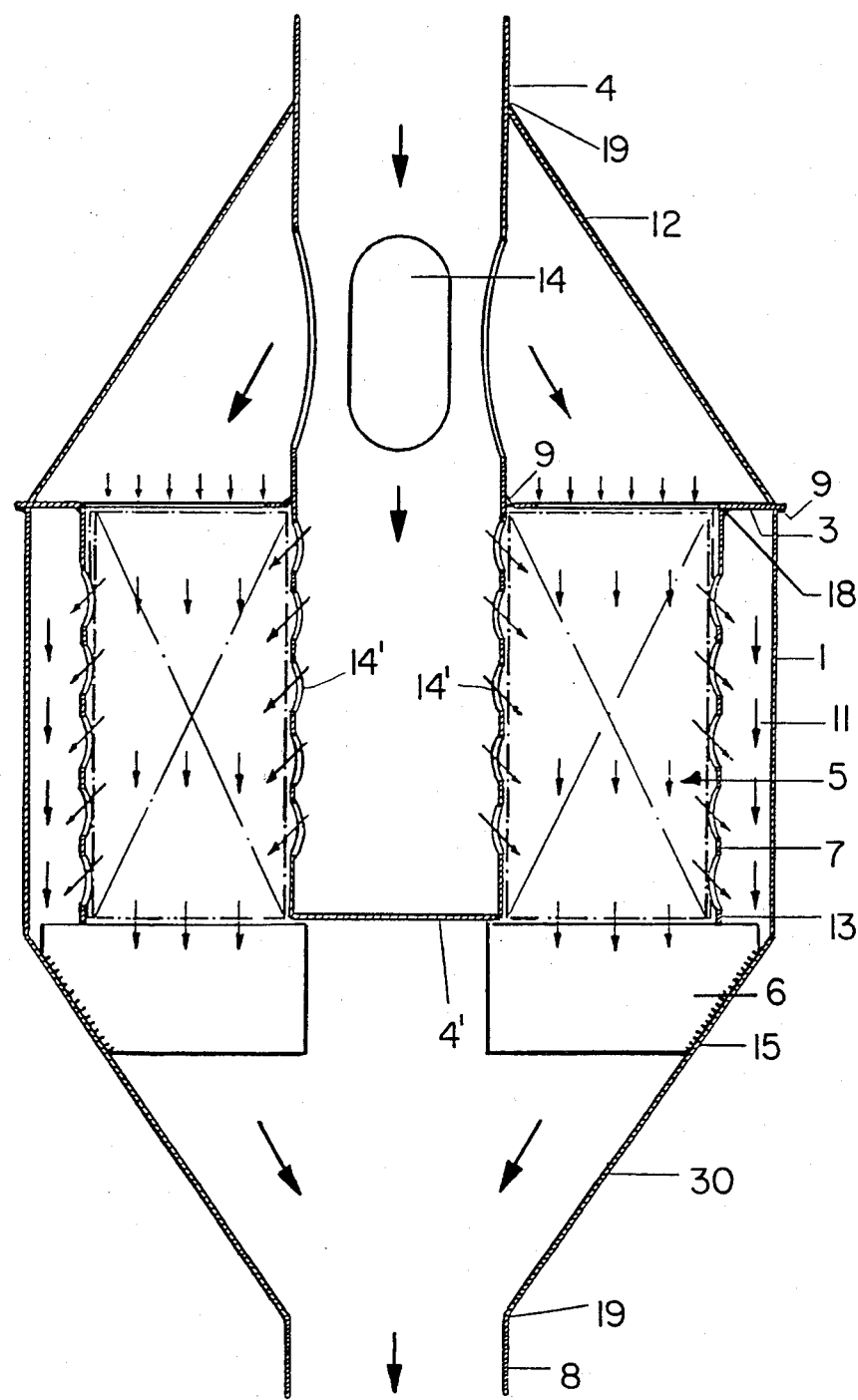
Figure 2:
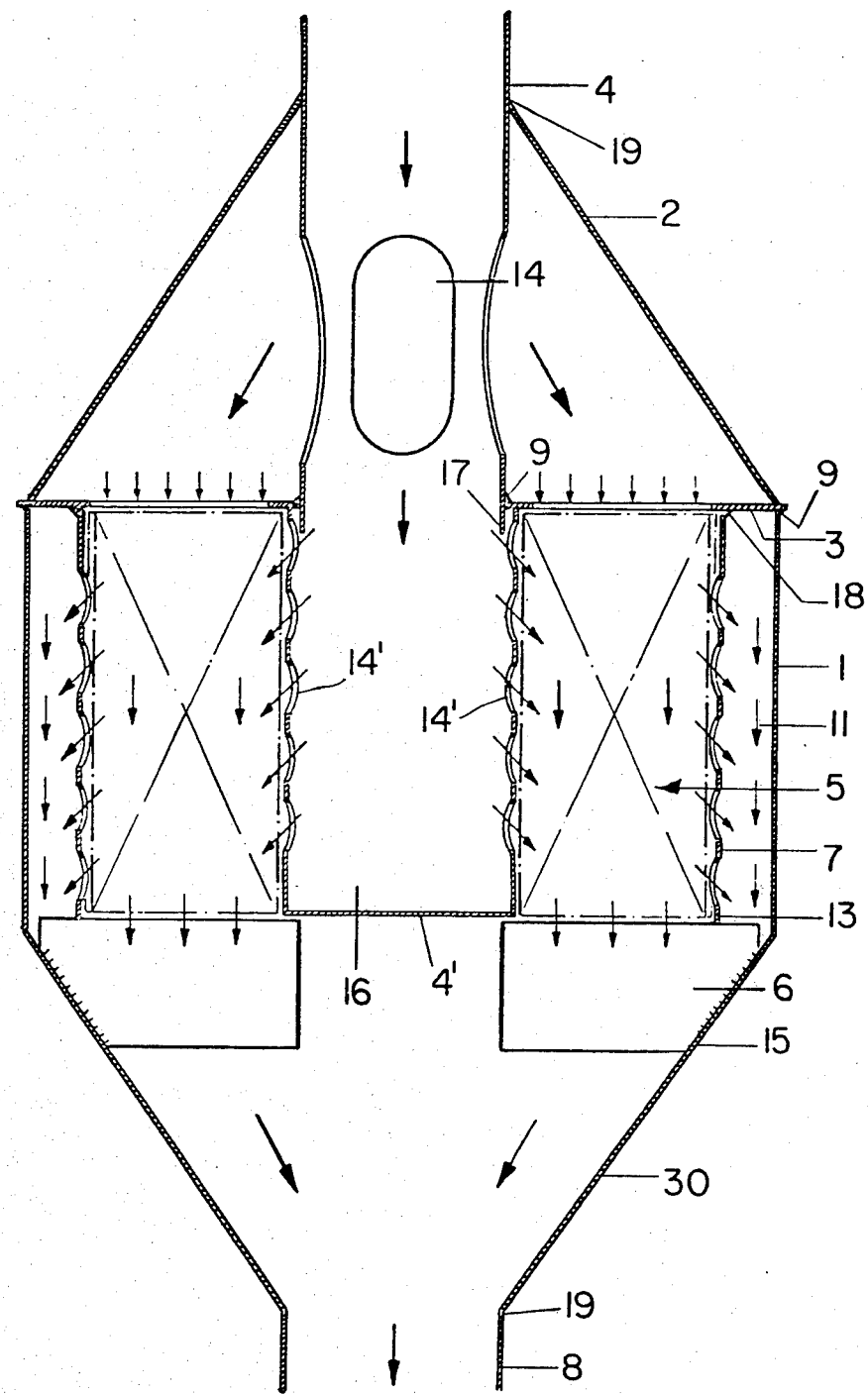
FIG. 2 is a view similar to FIG. 1 of a modification of the invention in which the perforated section of the gas inlet tube is replaced with a separate perforated cylinder.

According to FIGS. 1-4, the container of the waste gas converter includes a cylindrical housing section 1 having at its upstream end a frusto-conical cover 2 and at its downstream end a frusto-conical cover 30. A holding plate 3 having inner and outer flat rings connected by radial spokes 10 is fastened within the container at the transition or intersection 9 between the cylindrical housing section 1 and the cover 2. Extending through the cover 2 and the inner ring of the holding plate 3 is a cylindrical gas inlet or supply tube 4 closed at its inner end, as at 4'. At its upstream end, the tube extends out of the cover 2. The closed downstream end 4' of the tube 4 is substantially at the plane of the transition or intersection between the cover 30 and the housing section 1. That section of the tube 4 extending within the cover 2 is provided with a plurality of longitudinally elongated openings 14. The section of the tube 4 extending downstream beyond the holding plate 3 is provided with a plurality of perforations 14' and carries the catalyst-carrying tubular matrix 5 in the form of a coil of alternating smooth and corrugated steel screens, with the corrugations extending longitudinally of the coil. This perforated section of the gas inlet tube 4 can be replaced by a separate perforated cylinder 16 closed at its downstream end, as shown in FIG. 2. In such construction, the gas supply tube 4 extends into and terminates just below the upstream end of the cylinder 16, as at 17, and is welded to the holding plate 3, as at 9.

The steel screen of the coil 5 preferably is made of high temperature resistant and scale resistant steel. The outer diameter of the coil 5 is less than that of the section 1 and only slightly larger than the inner diameter of the outer ring of the holding plate 3. The tubular matrix or coil 5 is supported at its downstream end by a plurality of radial flanges 6 which are secured to and within the cover 30. The matrix or coil 5 has a large geometric surface area and a good catalyst supporting capability as compared to catalyst supporting carrier materials present in immersed dispersion. For example, the screens of the coil 5 are coated with $\gamma$-$Al_2O_3$ in which case the coating, usually in a layer applied by the wash coat process, supports a catalytically active component containing the elements platinum, rhodium and/or aluminum. There can be used, however, all of the catalyst supporting carrier materials and catalyst compositions proposed for the purification of the exhaust gases of internal combustion engines, as are described in the aforementioned German patent applications P No. 2853547.9 and P No. 2908671.3.

Figure 3:
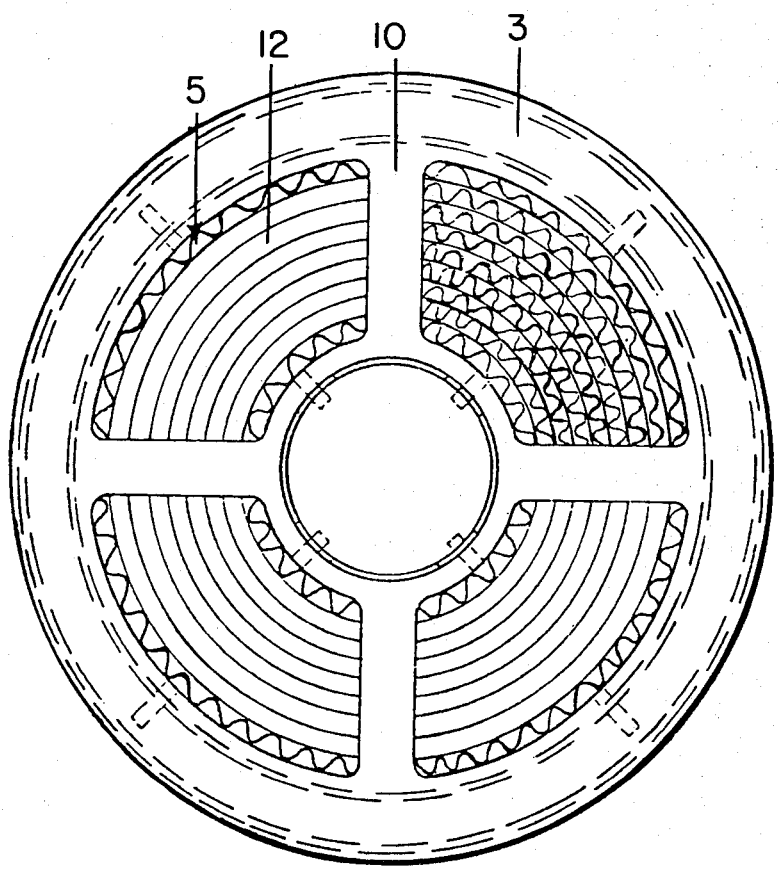
FIG. 3 is a cross-sectional view of the converter shown in FIG. 1.
Figure 4:
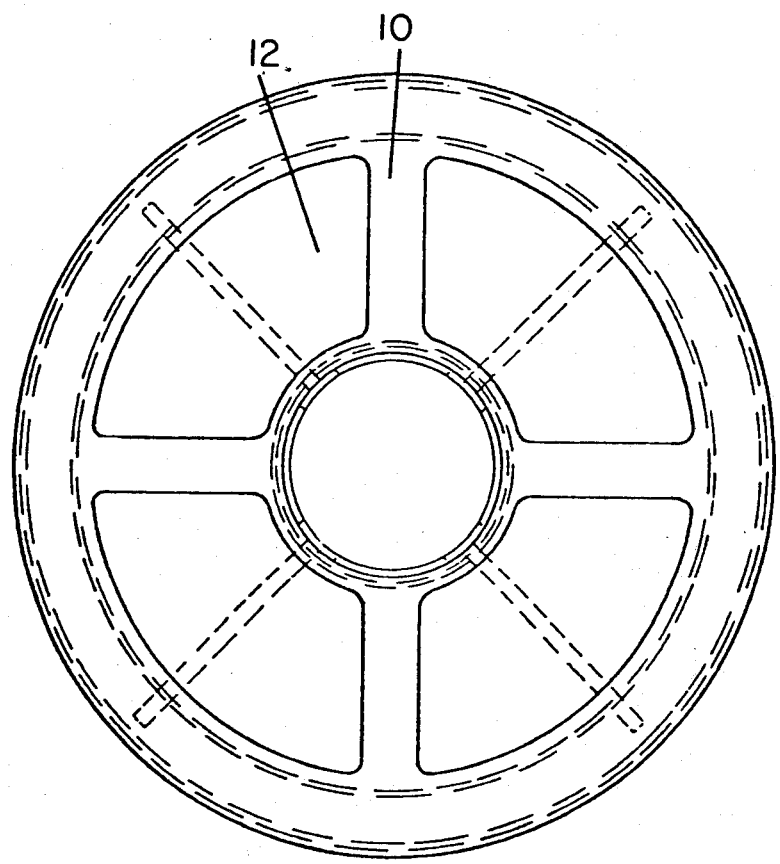
FIG. 4 is a cross-sectional view of the converter shown in FIG. 2.

To strengthen the coil 5, it is enclosed in a perforated cylinder 7 which is attached to the periphery of the coil. The cylinder is welded to the outer ring of the holding plate 3, as at 18. A short gas withdrawal or exit tube 8 is secured to the apex of the frusto-conical cover 30, as at 19. The spokes 10 of the holding plate 3 preferably are arranged in the form of a cross, as shown in FIG. 3, while the outer ring of the holding plate is wide enough to provide an adequate annular flow channel 11 between the cylinders 1 and 7 for the flowing off or exiting of the gas from the entire outer periphery of the matrix 5. In the embodiment shown in FIGS. 1 and 2, the gas also flows or exits from the downstream end of the coil 5. The several layers of the coil 5 preferably are welded or soldered together at spaced intervals at its upstream end 12 and also at its outer circumference 13. It should be emphasized, however, that such welding or soldering can be reduced or eliminated since the coil is supported sufficiently between the holding plate 3 and the flanges 6 and between the tube 4 or cylinder 16 and the outer perforated cylinder 7. The inner layer of the coil, however, should be welded to the gas supply tube 4 or the cylinder 16.

The assembly of the waste gas converter shown in FIGS. 1 and 2 is accomplished as follows:

The longitudinal edges of the innermost alternating smooth and corrugated layers of the steel screen of the coil 5 are welded to the perforated section of the gas supply tube 4, or to the cylinder 16. Subsequently the screens are wound into the finished coil 5. The finished coil or carrier matrix 5 then is inserted into the perforated cylinder 7. Then, according to requirements, the interleaved, smooth and corrugated layers, or turns, can be welded together at various spaced intervals at the inlet end of the coil. Similarly, the outer layers or turns of the coil 5 can be welded to the outer perforated cylinder 7. The outer cylinder 7 of the finished carrier body is welded, as at 18, to the carrier plate 3. Likewise, the gas supply tube 4 is welded to the carrier plate 3, as at 9. Along with these operations, the cylindrical container or housing section 1 is welded to its frusto-conical cover 30 and the latter welded to the gas withdrawal tube 8, as at 19. The cross shaped holding flanges 6 are welded in place within the conical cover 30. Then the carrier matrix 5, with the gas supply tube 4 and holding plate 3, are inserted into the housing section 1 and welded together as at 9. Subsequently, the conical cover 2 is welded to the housing plate 3 and to the gas supply tube.

The embodiments shown in FIGS. 5-12 are alternative constructions to the embodiments shown in FIGS. 1 and 2. The embodiments of FIGS. 5-12 differ from those shown in FIGS. 1 and 2 by different flow paths for the waste gas and different types of holders for the carrier matrix 5.

Figure 5:
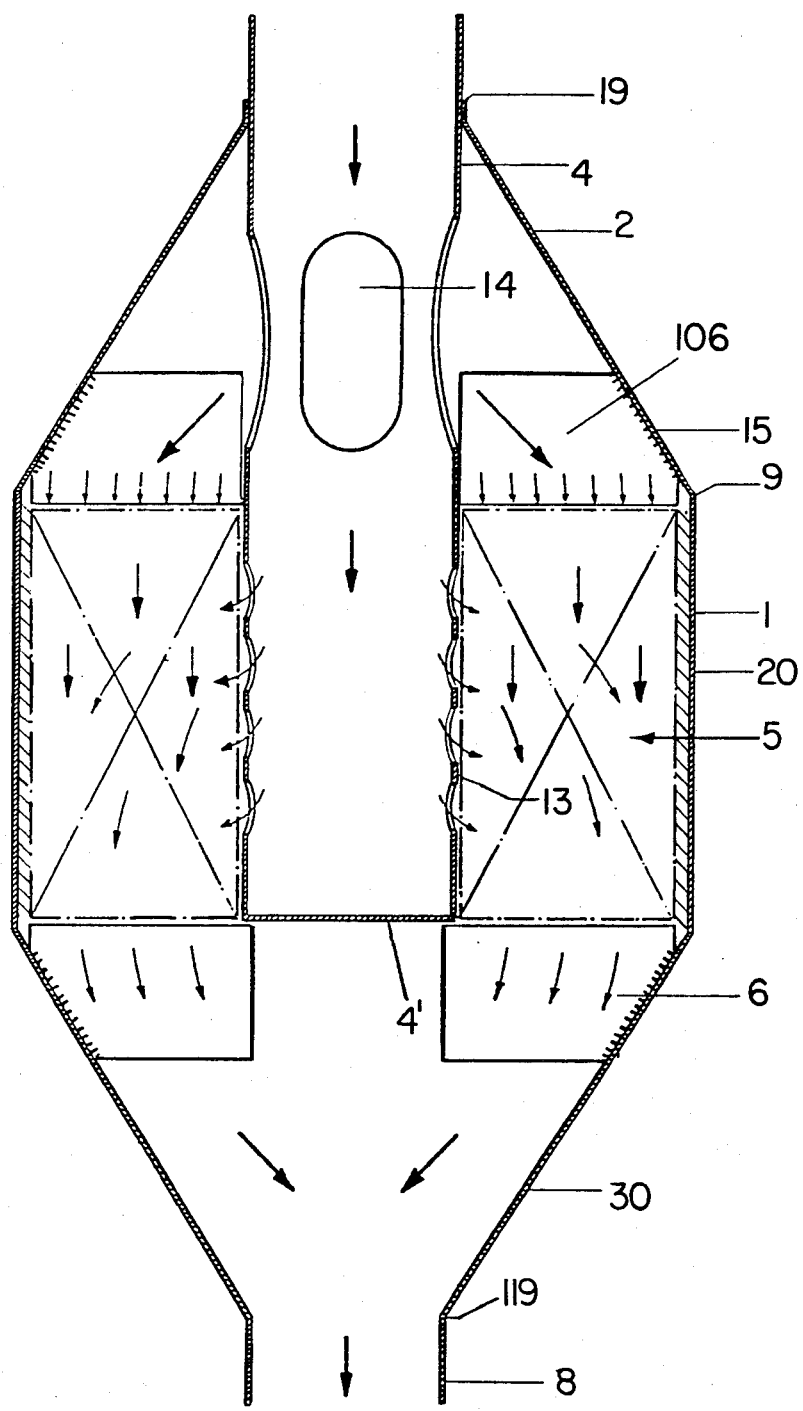
FIG. 5 is a view similar to FIG. 1 of another modification of the invention wherein the impingement of the tubular matrix with waste gas takes place as shown in FIGS. 1 and 2 but the flowing off or exit of the gas takes place only from the downstream end of the tubular matrix.
Figure 6:
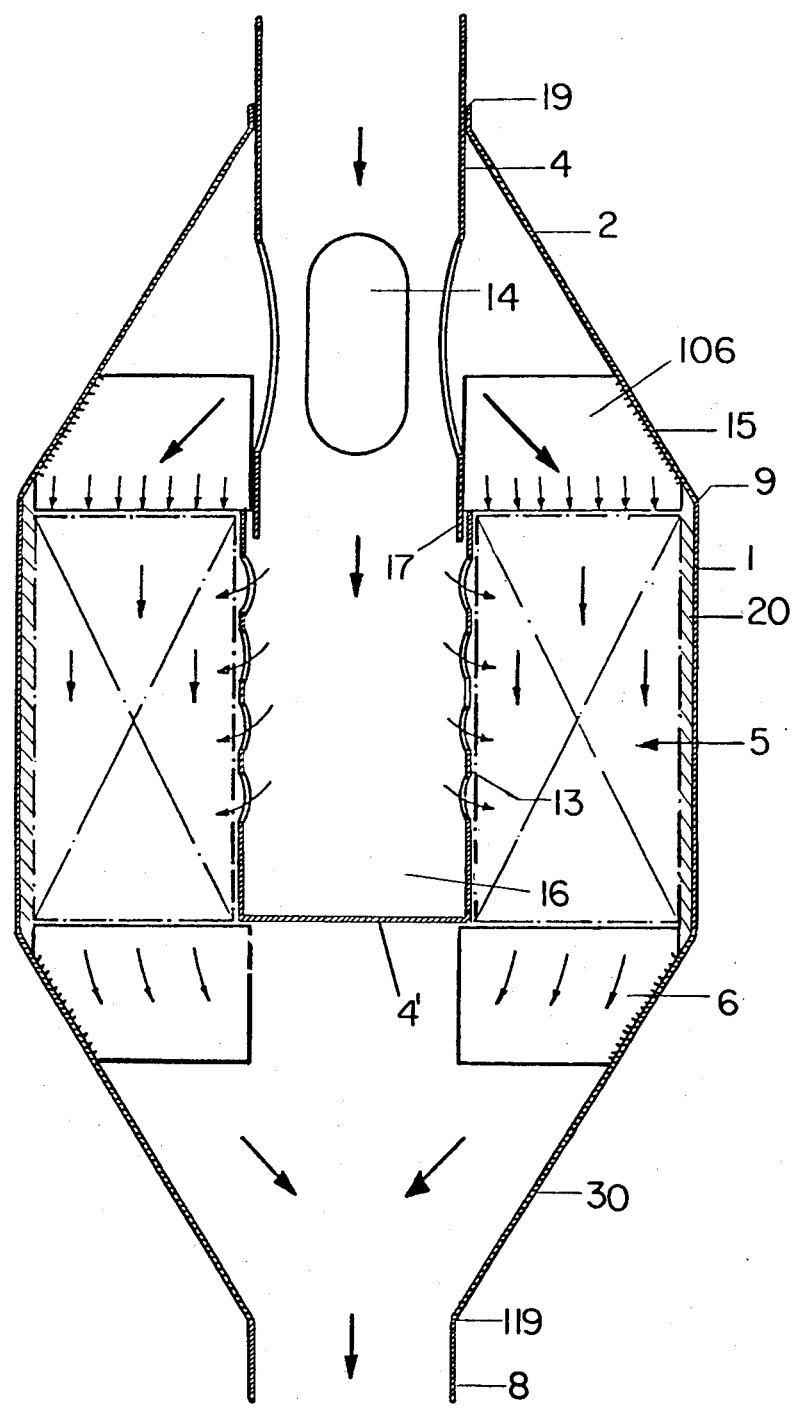
FIG. 6 is a view similar to FIG. 5 of another modification of the invention in which the perforated section of the gas inlet tube is replaced with a separate perforated cylinder.

In the embodiments shown in FIGS. 5 and 6, the outer cylinder 7 is omitted and the outer periphery of the tubular matrix 5 is disposed closely adjacent the cylindrical housing section 1 with a layer of thermal insulation 20 therebetween. Further, the holding plate 3 is omitted and replaced with supporting flanges 106, like the flanges 6. This construction of the converter permits both longitudinal flow of gas through the matrix 5, and also flow laterally outwardly into the matrix from the central opening therethrough and thence longitudinally outwardly from the downstream end of the matrix. In other words, there is both longitudinal and lateral flow of the gas into the matrix 5 but the gas exits only longitudinally from the downstream end of the matrix. Preferably, the insulating material 20 is ceramic felt and the matrix 5 is not welded to a holding plate but is supported at its upstream and downstream ends, respectively, by the flanges 106 and 6.

Figure 7:
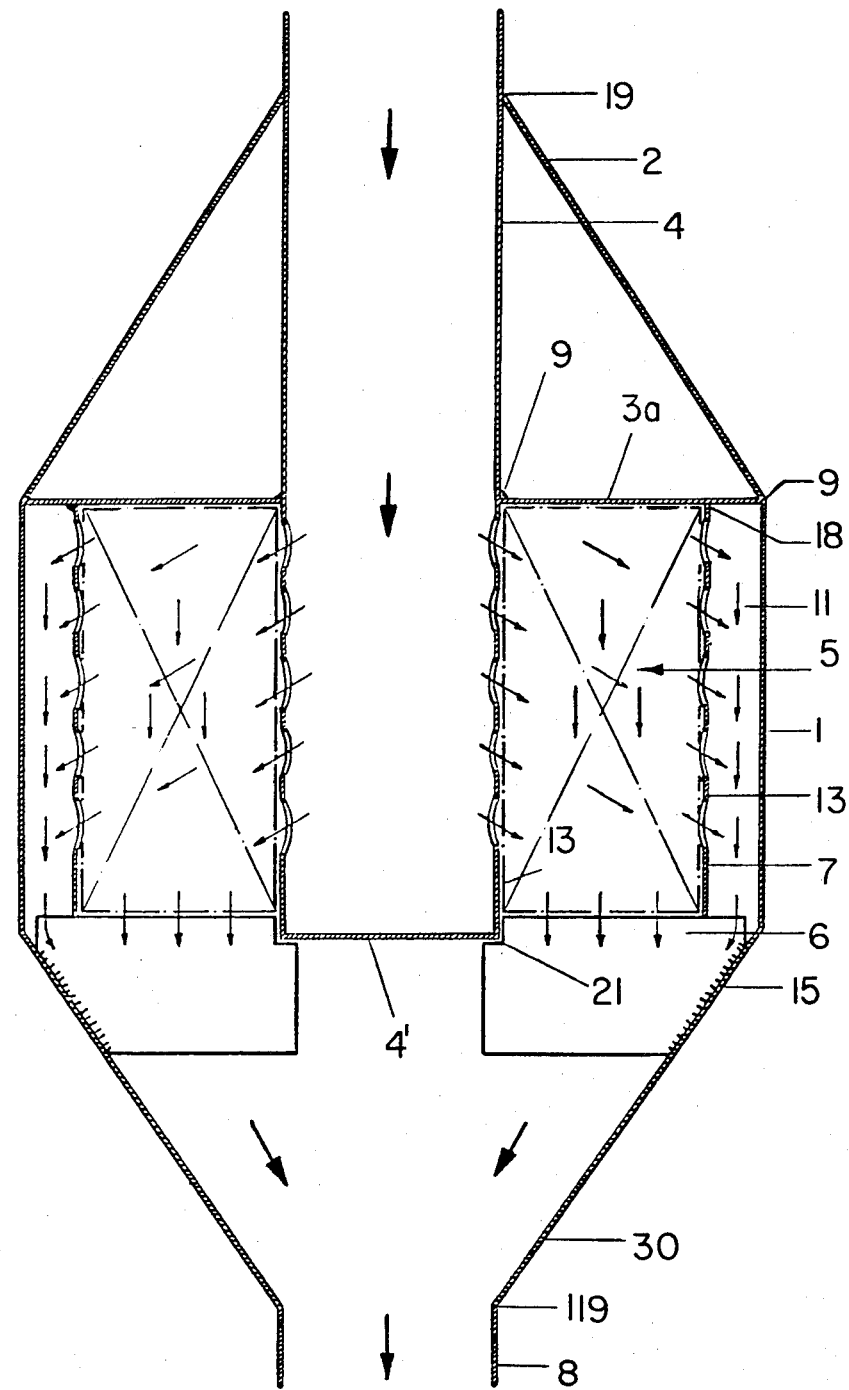
FIG. 7 is a view similar to FIG. 1 of another modification of the invention in which the impingement of the tubular matrix with waste gas occurs only on the walls of the central opening through the matrix, via the perforated section of the gas inlet tube, and the flowing off or exit of the gas takes place from both the downstream end of the matrix and its entire outer periphery.
Figure 8:
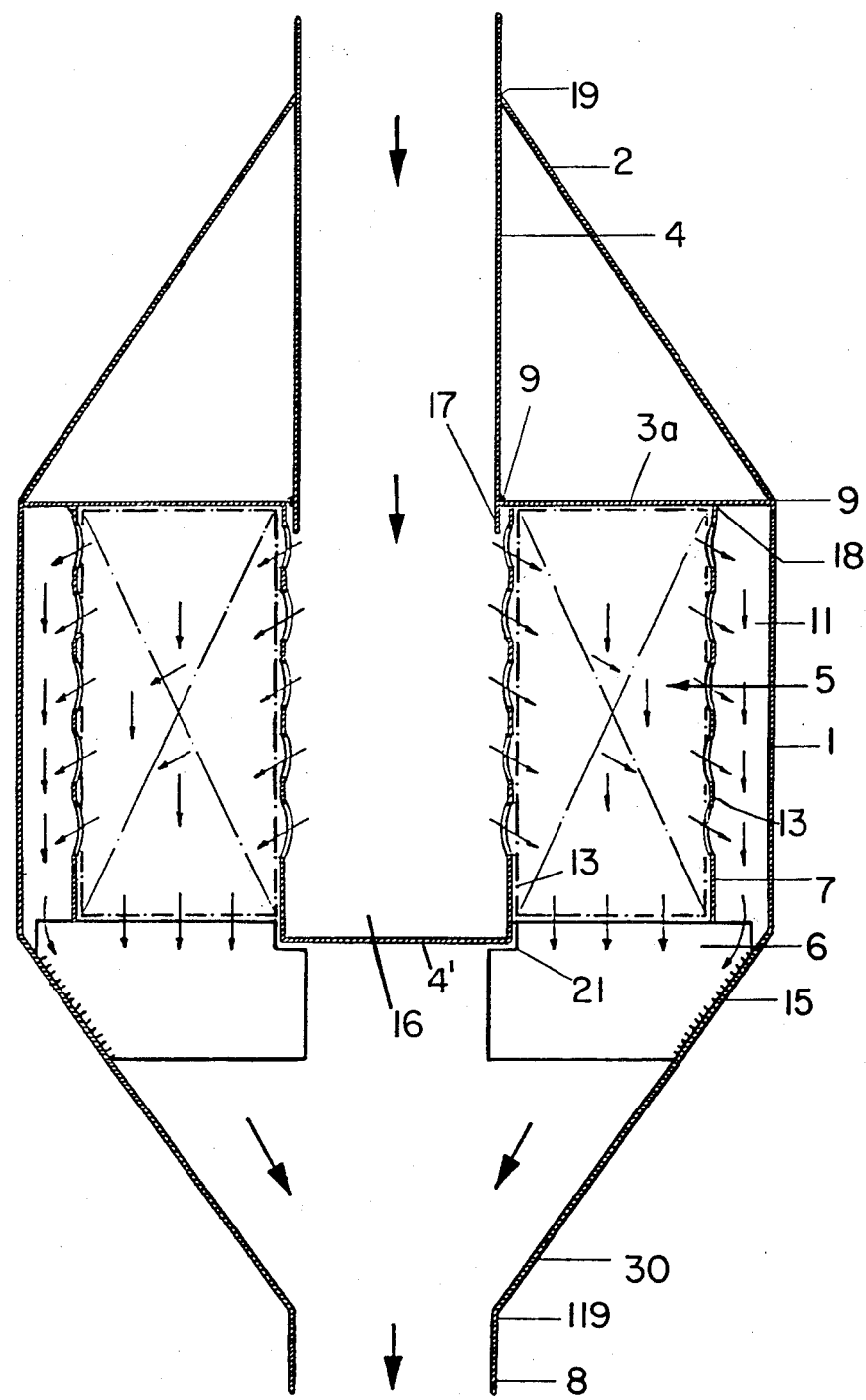
FIG. 8 is a view similar to FIG. 1 of another modification of the invention similar to that of FIG. 7 but wherein the perforated section of the gas inlet tube is replaced by a separate perforated cylinder.

In the embodiments shown in FIGS. 7 and 8, the annular holding plate 3a is imperforate and welded, as at 9, to both the inlet tube 4 and the edge of the frusto-conical cover 2. That section of the gas supply tube 4 disposed within the cover 2 has no openings therein, i.e. is imperforate, and has perforations only in that section thereof extending within the tubular matrix 5. The outer diameter of the carrier matrix 5 is smaller than that of both the housing section 1 and the holding plate 3a in order to form an annular gas exit channel 11 between the matrix 5 and the housing section 1. At its closed end 4' the gas supply tube 4 is secured in notches 21 in the supporting flanges 6. This modification admits waste gas to the tubular matrix 5 only through the perforated section of the inlet tube 4, i.e., only from within the central opening through the coil 5. The purified waste gas exits from the coil 5 both into the annular channel 11 and at the downstream end of the matrix 5, so that there is both a lateral and longitudinal exit of the gas from the tubular matrix 5. The matrix 5 is supported, without welding, between the holding plate 3a and the flanges 6. The notches 21, in the latter, prevent lateral displacement of the closed end of the gas supply tube which projects somewhat beyond the tubular matrix 5.

Figure 9:
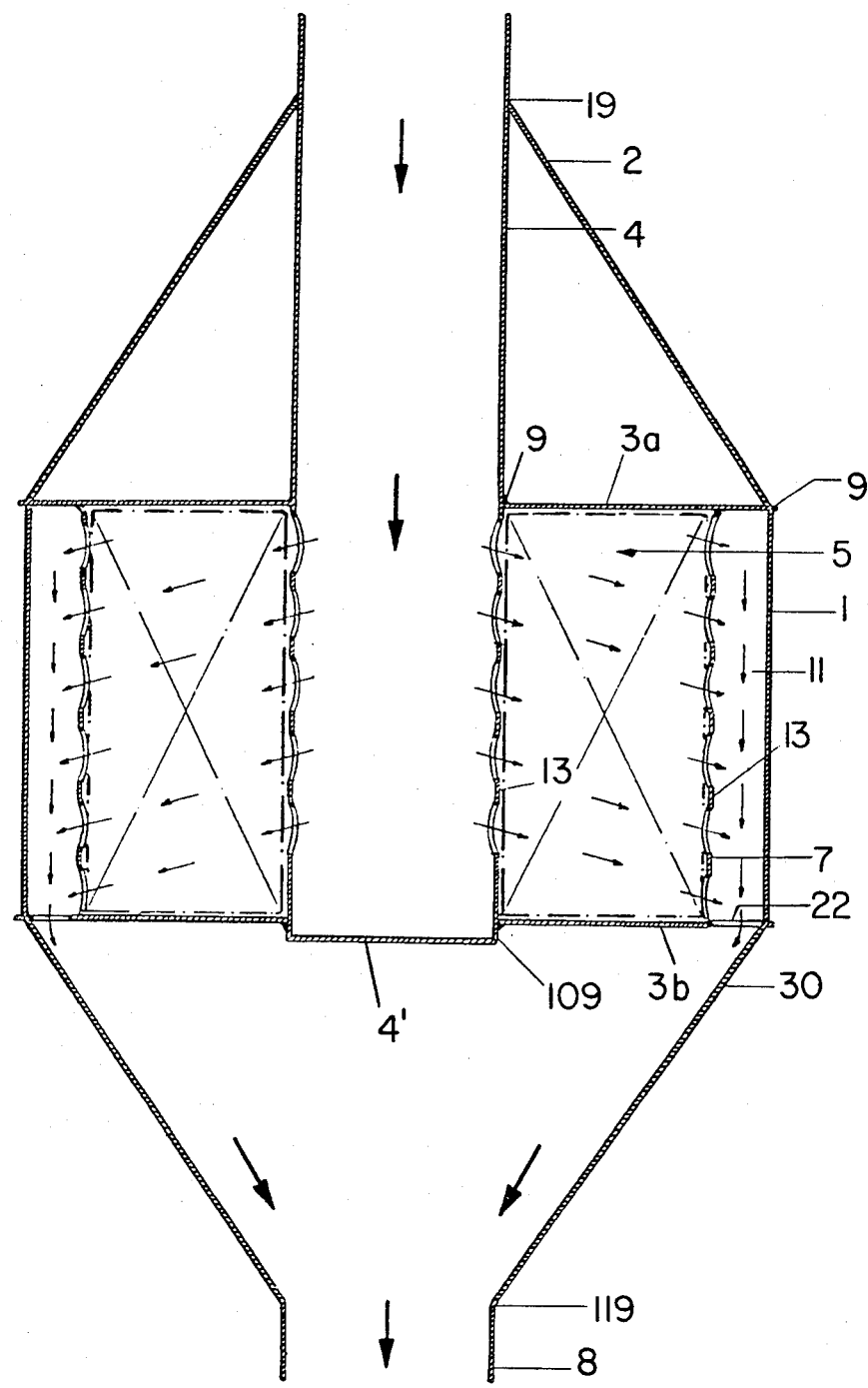
FIG. 9 is a view similar to FIG. 1 of another modification of the invention in which impingement of the tubular matrix with waste gas takes place only on the walls of the central opening extending through the matrix, via the perforated section of the gas inlet tube, and the gas exits from the matrix only from its entire outer periphery.
Figure 10:
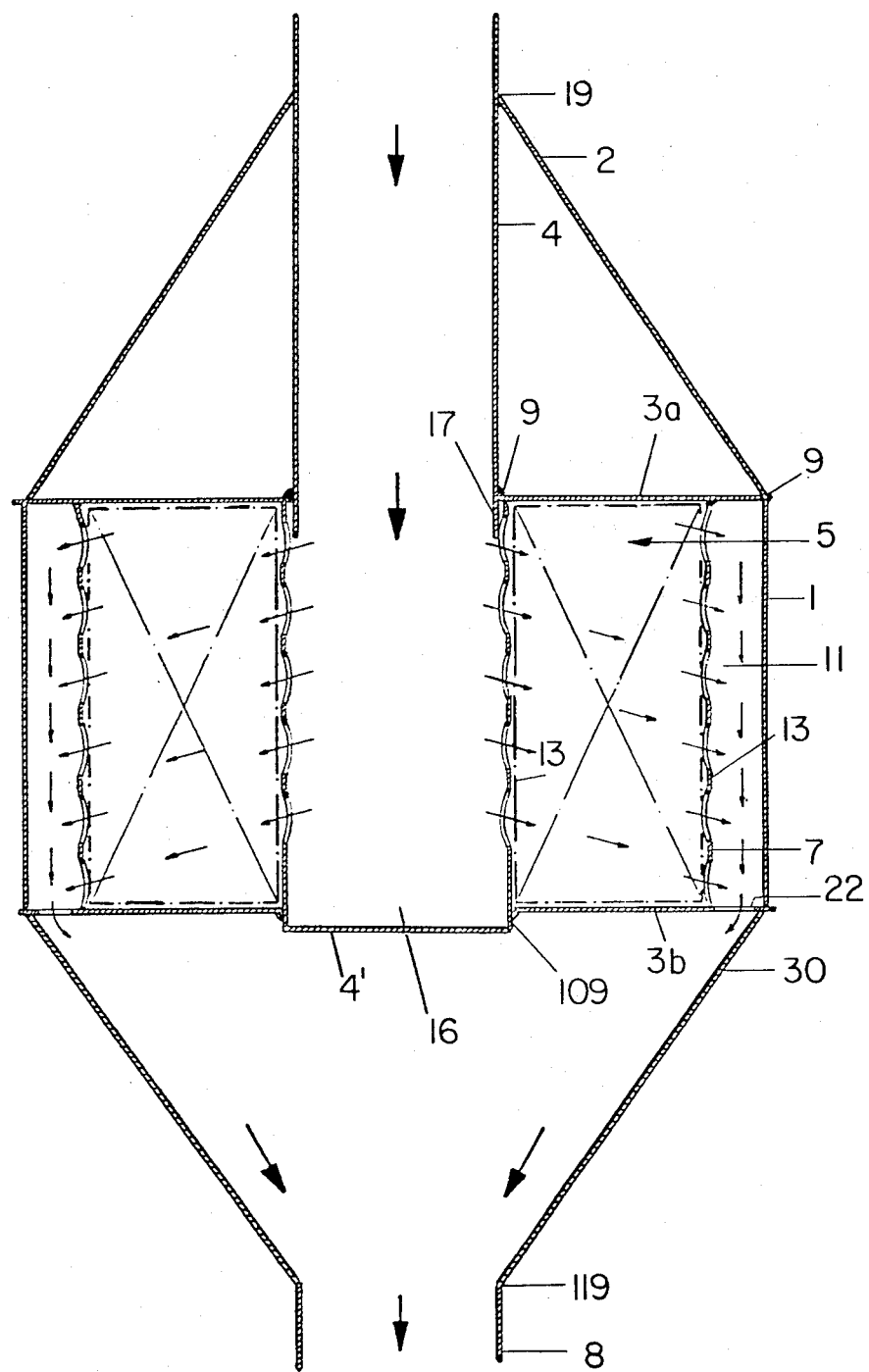
FIG. 10 is a view similar to FIG. 1 of another modification of the invention similar to FIG. 9 but wherein the perforated section of the gas inlet tube is replaced by a separate perforated cylinder.

In the modifications shown in FIGS. 9 and 10, an annular imperforate holding plate 3a is secured, as at 9, to both the gas inlet tube 4 and the larger end of the cover 2. Between the cylindrical housing section 1 and the outlet cover 30 a holding plate 3b is welded to the gas supply tube 4 as at 109. The plate 3b has a circular array of openings 22 in its marginal outer edge portion through which gas exits from the annular channel 11. The annular channel 11 is formed because the outer diameter of the tubular matrix 5, as in the converter shown in FIGS. 7 and 8, is smaller than the diameter of the holding plates 3a and 3b. In this construction, there is only a lateral outward flow of the gas through the matrix from the central opening therein to the annular channel 11. Further, the tubular matrix 5 is supported endwise only by the holding plates 3a and 3b and lateral displacement is prevented by slightly lengthening the gas supply tube 4.

Figure 11:
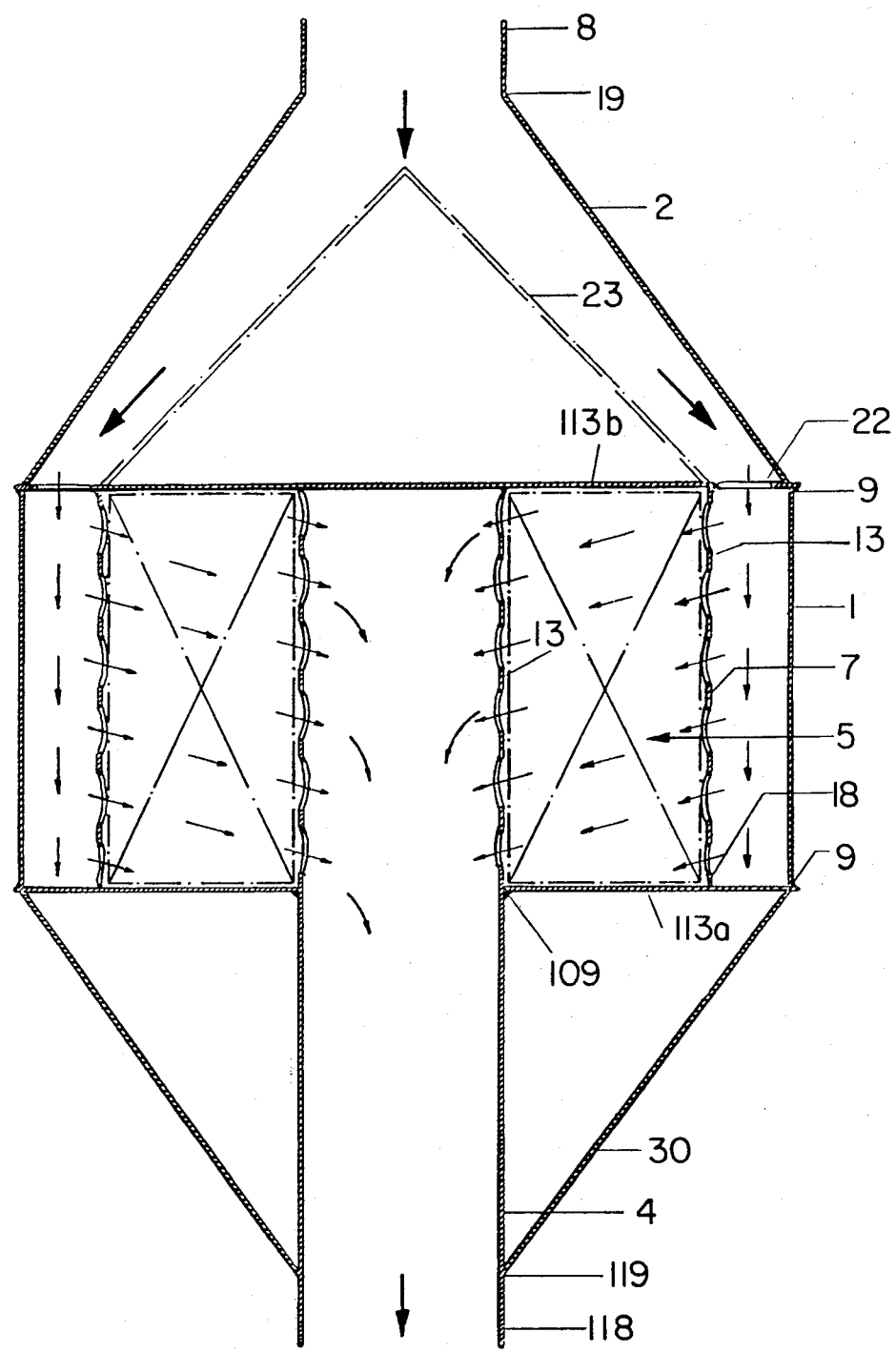
FIG. 11 is a view similar to FIG. 1 of still another modification of the invention in which impingement of the tubular matrix with waste gas occurs only about its entire outer periphery, via a perforated matrix jacket, and the gas flows off or exits only from the inner wall of the matrix, i.e., only through the central opening therethrough, via a perforated gas removal tube.
Figure 12:
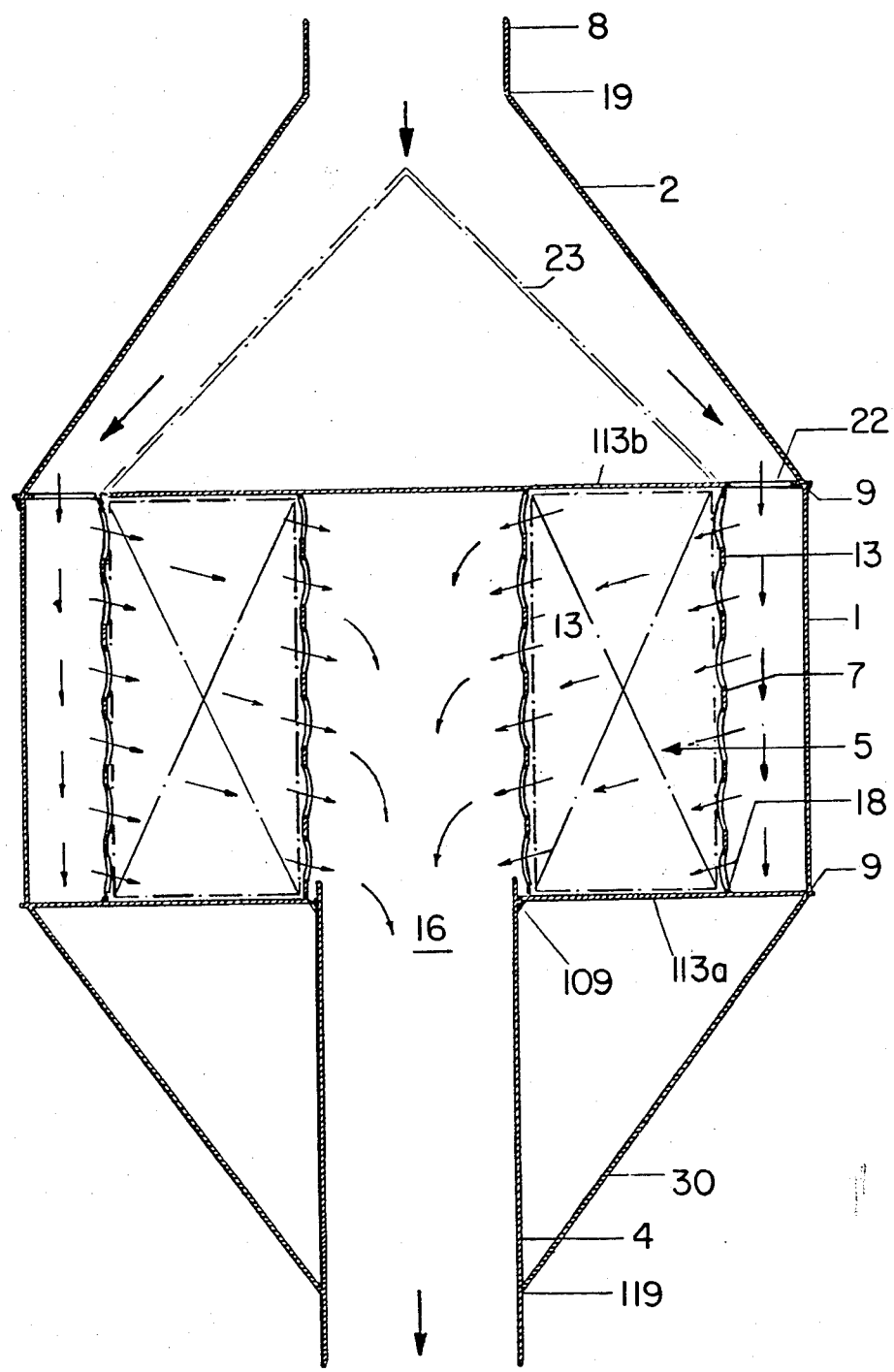
FIG. 12 is a view similar to FIG. 1 of another modification of the invention similar to that of FIG. 11 but wherein the perforated section of the gas removal tube is replaced by a separate perforated cylinder.

In the embodiments shown in FIGS. 11 and 12, a first circular holding plate 113b is provided with gas inlet openings 22 only in an annular outer marginal edge portion. The plate 113b is secured, as at 9, to the larger end of the frusto-conical 2 and to the upstream edge of the cylindrical housing section 1. An annular imperforate holding plate 113a supports the downstream end of the cylindrical matrix 5 and is secured, as at 9, to both the downstream edge of the cylindrical housing section 1 and the corresponding edge of the downstream cover 30. The plate 113a surrounds a gas exit tube 4, and is secured thereto, as by welding, as at 109. The tube 4 extends upstream through the central opening in the matrix to the holding plate 113b and abuts this in gas tight relation. At its downstream end, tube 4 extends out of the frusto-conical cover 30. That section of the tube 4 disposed within the central opening in the matrix 5 is perforated for admission of gas thereinto from the matrix 5. In this embodiment, there also is formed an annular channel between the periphery of the tubular matrix 5 and the cylindrical section 1. The cover 2 has a short gas inlet tube 8 at its apex and preferably a distribution cone 23 is disposed within the cover 2 so that gas entering the latter will be better distributed to the openings 22 for flow therethrough into the annular channel and thence radially inwardly through the perforations in the cylinder 7, through the tubular matrix 5, and thence through the perforations in the gas exit tube 4.

In this modification, it will be seen that gas flows through the tubular matrix 5 only from its outer periphery laterally inwardly therethrough into its central opening. Preferably the perforated outer cylinder or casing 7 of the matrix 5 is welded to the downstream holding plate 113a, as at 18, to prevent lateral displacement of the matrix.

The above described converter constructions are useful with narrow mesh coil screens coated with porous carriers of catalyst compositions as catalytic filters for the purification of carbon containing diesel engine waste gases in which the carbon particles are filtered from the waste gas stream and the volatile materials converted to innocuous products by catalytic action.

The entire disclosure of German priority application P No. 2922841.7 is hereby incorporated by reference.

The converter can comprise, consist essentially of or consist of the stated elements.

The smooth and corrugated or undulating steel screen can have a mesh aperture of 0.5 to 2.5 mm, preferably 0.8 to 1.6 mm, especially 1.0 mm and a wire thickness of 0.2–0.4 mm (e.g., 0.26 mm), preferably 0.2–0.3 mm, especially 0.25 mm.

What is claimed is:

1. A catalytic waste gas converter suitable for the use with an internal combustion engine or a diesel engine comprising in combination a cylindrical housing with gas inlet means at one end thereof and gas withdrawal means at the other end thereof, a first conical cover at the gas inlet end of the housing and a second conical cover at the gas withdrawal end of the housing, a gas supply tube passing through the cover on the gas inlet end of the housing and extending up to the plane of a first transition between the cylindrical housing and the cover at the gas withdrawal end of the housing, said gas supply tube being closed at the end thereof, the section of the gas supply tube before a second transition between the housing and the cover at the gas inlet of the housing having openings at the circumference and the section of the gas supply tube lying below said second transition having perforations, a coil surrounding the perforated section of the gas supply tube and being made of catalyst coated, alternating smooth and undulating layers of a high temperature and scale resistant steel screen, said coil being supported on its downstream face by flange means fastened to the cover on the gas withdrawal side and on its upstream face by flange means fastened to the cover on the gas inlet side, an insulation layer disposed on the periphery of said coil, said coil and insulation layer being in the form of a roll in the cylindrical housing and a gas withdrawal tube attached to the cover on the gas withdrawal end of the housing.

2. A waste gas converter according to claim 1 wherein the layers of the catalyst coil are at least partially soldered or welded together at their front sides.

3. A waste gas converter according to claim 2 wherein the first layer of the catalyst coil is welded or soldered to the gas supply tube.

4. A waste gas converter according to claim 1 wherein the first layer of the catalyst coil is welded or soldered to the gas supply tube.

5. A waste gas converter according to claim 1 wherein the respective flange means for the catalyst coil are welded or soldered to the conical covers.

6. A waste gas converter according to claim 1 wherein the gas supply tube is welded or soldered to the first conical cover and the gas withdrawal tube is welded or soldered to the second conical cover.

7. A catalytic waste gas converter suitable for use with an internal combustion engine comprising in combination a cylindrical housing with gas inlet means at one end thereof and gas withdrawal means at the other end thereof, a first conical cover at the gas inlet end of the housing and a second conical cover at the gas withdrawal end of the housing, a gas supply tube passing through the cover on the gas inlet end of the housing and terminating at the transition between the housing and the first conical cover, said gas supply tube opening into one end of a perforated cylinder which is closed at the other end thereof, the perforated cylinder extending to the plane of transition between the cylindrical housing and the cover at the gas withdrawal end of the housing, a coil surrounding the perforated cylinder and being made of catalyst coated, alternating smooth and undulating layers of a high temperature and scale resistant steel screen, said coil being supported on its downstream face by flange means fastened to the cover on the gas withdrawal side and on its upstream face by flange means fastened to the cover on the gas inlet side, an insulation layer disposed on the periphery of said coil, said coil and insulation layer being in the form of a roll in the cylindrical housing and a gas withdrawal tube attached to the cover on the gas withdrawal end of the housing.

8. A waste gas converter according to claim 7 wherein the layers of the catalyst coil are at least partially soldered or welded together at their front sides.

9. A waste gas converter according to claim 7 wherein the gas supply tube is welded or soldered to the first conical cover and the gas withdrawal tube is welded or soldered to the second conical cover.

10. A waste gas converter according to claims 1 or 7 wherein the steel screen has a mesh aperture of 0.5 to 2.5 mm and a wire thickness of 0.2 to 0.4 mm.

11. A waste gas converter according to claim 10 wherein the steel screen has a mesh aperture of 0.8 to 1.6 mm and a wire thickness of 0.2 to 0.3 mm.

* * * * *